United States Patent [19]

Bormke

[11] 4,395,009
[45] Jul. 26, 1983

[54] RACEWAY CLAMP

[75] Inventor: Odo S. Bormke, Gig Harbor, Wash.

[73] Assignee: The Boeing Company, Seattle, Wash.

[21] Appl. No.: 267,953

[22] Filed: May 28, 1981

[51] Int. Cl.³ .............................................. F16L 3/22
[52] U.S. Cl. ............................... 248/68 CB; 174/157;
                                          248/74 A; 285/131
[58] Field of Search ............. 248/68 CB, 74 A, 68 R,
       248/74 PB, 58, 59, 49, 55, 57; 285/131, 137 R;
                        174/155, 156, 157; 211/60 R, 64

[56] References Cited

U.S. PATENT DOCUMENTS

| | | | |
|---|---|---|---|
| 2,929,539 | 3/1960 | Safreno | 211/64 X |
| 2,931,607 | 4/1960 | McFarland | 248/74 R X |
| 3,894,706 | 7/1975 | Mizusawa | 248/68 CB |
| 4,118,838 | 10/1978 | Schiefer et al. | 174/156 |

FOREIGN PATENT DOCUMENTS

| | | | |
|---|---|---|---|
| 221618 | 11/1961 | Austria | 248/74 PB |
| 2363687 | 5/1975 | Fed. Rep. of Germany | 248/74 PB |
| 2505628 | 8/1975 | Fed. Rep. of Germany | 248/68 R |
| 1350571 | 4/1974 | United Kingdom | 248/68 R |

*Primary Examiner*—William H. Schultz
*Assistant Examiner*—Ramón O. Ramirez
*Attorney, Agent, or Firm*—Conrad O. Gardner; Bernard A. Donahue; Nicolaas DeVogel

[57] ABSTRACT

A three-part raceway clamp which includes a U-shaped element with a vertical saw-tooth leg at each end of the base for mounting the second section which contains the configured sections to support and separate the tubes or wires, and further including a third section having a cushion for application of pressure to the articles to be clamped.

1 Claim, 6 Drawing Figures

RACEWAY CLAMP

The present invention relates to a raceway clamp and more particularly to a raceway clamp for supporting tubing and/or electrical cable wherein the raceway clamp utilizes a snap-on concept without utilization of tools for installation or removal of clamped elements.

Heretofore the patent literature has included pipe or cable clamp devices provided with serration-type snap fitting clamps as shown in U.S. Pat. Nos. 3,188,030; 3,856,246; 4,118,838; and Denmark Pat. No. 86,894. U.S. Pat. No. 3,188,030, as well as U.S. Pat. No. 3,147,754, show the use of generally U-shaped clamping elements with leg serrations. An approach to sandwiching configuration is shown in U.S. Pat. No. 770,278.

Conventional raceway clamps utilized in wire bundle support in aircraft have required the installation of wire bundles in the aircraft; also no wire bundle separation allowance is provided. Such conventional two-piece support structure utilized a snap-on support bracket after wire bundle installation which clamping provided a flush relationship thereby limiting room for rework. Such conventional raceway clamp arrangement resulted in a tedious and time-consuming process.

In contrast, it is an object of the present invention to provide a raceway clamp including an intermediate wire bundle supporting element which permits bundle installation and attachment in the wire shop prior to aircraft installation.

It is a further object of the present invention to provide a raceway clamp which includes means for retaining wire bundle separation subsequent to clamp installation.

It is a further object of the present invention to provide a raceway clamping means having a strapping configuration for securing an intermediate wire bundle supporting element and wire bundles to allow tight installation.

It is yet another object of the present invention to provide a racway clamp means permitting bracket lowering thereby permitting automatic release for reworking as desired.

It is a further object of the present invention to provide a three-piece raceway clamp having snap-on capability for installation without tools.

In accordance with a preferred embodiment of the invention, a three-part clamp includes a generally U-shaped element adapted for mounting to a support in which the legs are provided with clamping serrations, an intermediate wire bundle supporting element provided with corresponding serrations for snap fitting to the U-shaped element, and a third end element provided with cushioning means and serrations for sandwiching the intermediate element on the U-shaped element.

Other objects and advantageous features of the preferred embodiment of the present invention will become readily apparent in view of the following detailed description taken in conjunction with the drawings in which.

Figure 1:
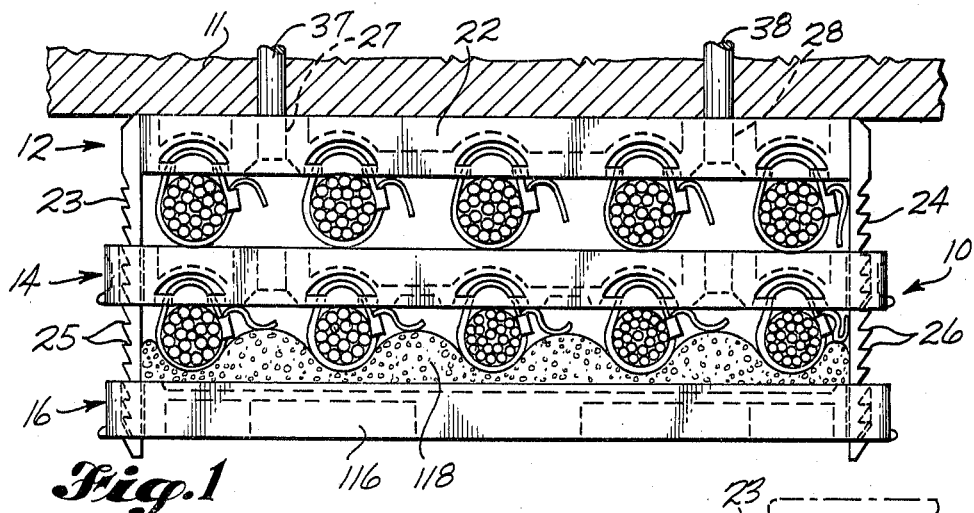
FIG. 1 is a front elevational view of a preferred embodiment of the present three-part raceway clamp.

Turning now to FIG. 1, it can be seen that the present raceway clamp assembly 10 includes a first member comprising a U-shaped base member 12. A second member comprises an intermediate wire bundle supporting element 14, while a third element comprising clamping member 16 is used for sandwiching intermediate wire bundle supporting element 14 on U-shaped base member 12 while further applying pressure to the wire bundles to be held by raceway clamp assembly 10.

U-shaped base member 12 has a bottom portion 22, intermediate spaced upright arms 23 and 24, each of arms 23 and 24 being resiliently movable toward and away from each other and having serrated outwardly facing surfaces each of which serrated surfaces include a plurality of lateral teeth 25 and 26 respectively which are angularly directed upwardly toward bottom portion 22 of U-shaped base member 12. Bottom portion 22 of U-shaped base member 12 includes a pair of mounting holes 27 and 28 (as best seen in FIG. 2) for providing support of raceway clamp assembly 10 to aircraft structure 11 by means of a pair of screws 38 and 38.

Figure 2:
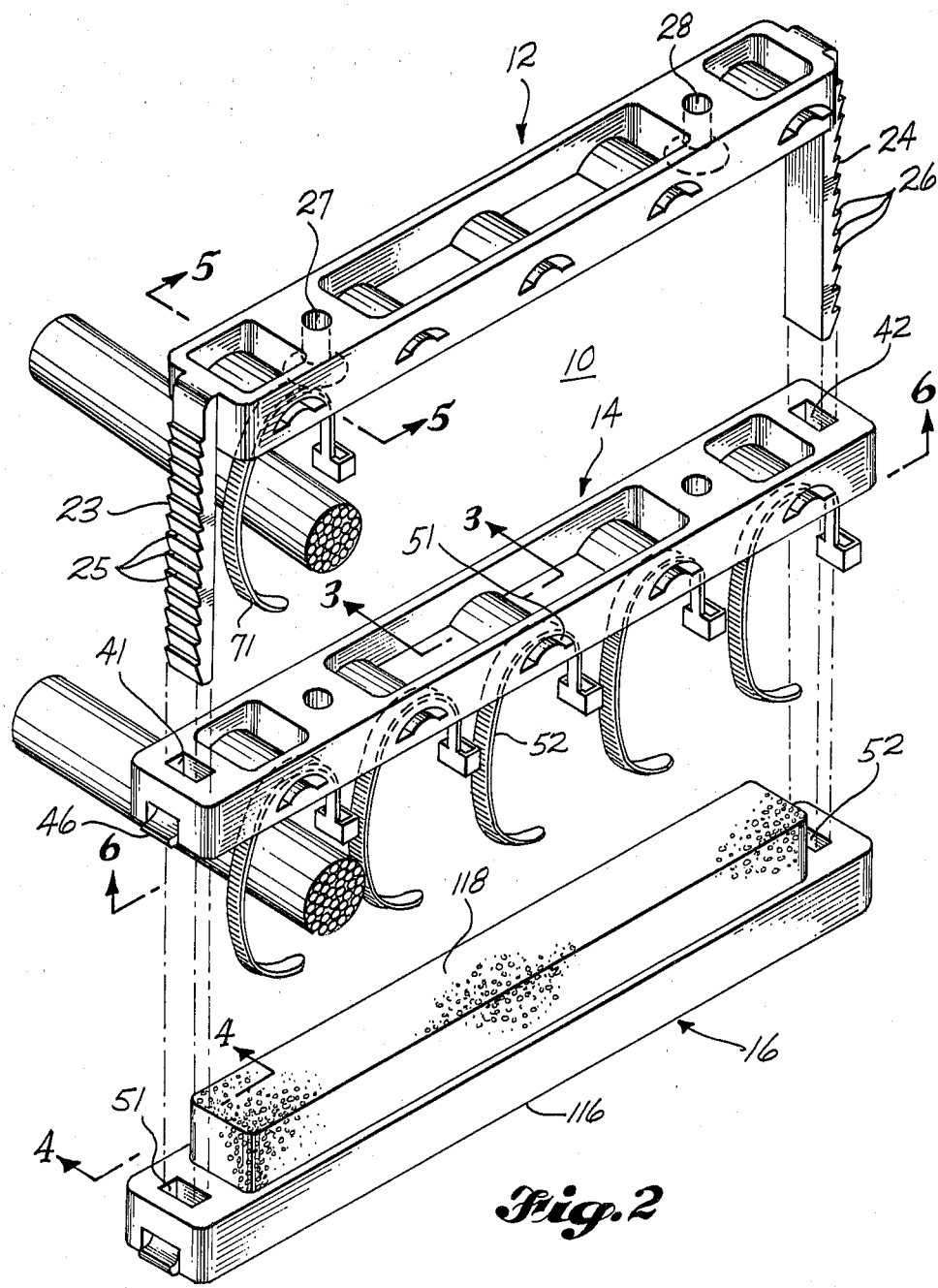
FIG. 2 is an exploded view in perspective of the three-part raceway clamp shown in FIG. 1.

Turning now to FIG. 2, a second member 14 which can be considered a universal saddle block for supporting and separating several tubes or electrical wire bundles to be held can be seen to include a pair of spaced apart openings 41 and 42 for engaging arms 23 and 24 respectively in various positions of adjustment. It should also be noted that third element 16 also includes corresponding openings 51 and 52 also adapted to adjustably receive arms 23 and 24 in various positions of adjustment.

Figure 4:
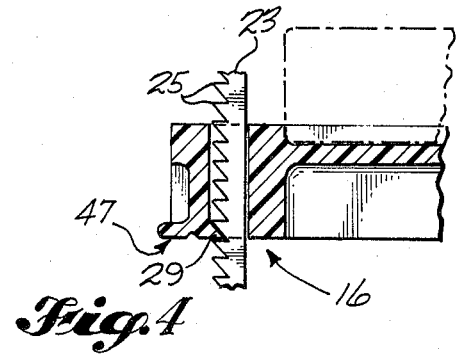
FIG. 4 is a section taken along the lines 4—4 of FIG. 2 and illustrative of the locking and release mechanism for adjustably securing the outer clamping elements to the legs of the U-shaped base mounting element.

Turning now briefly to FIG. 4 which is a section taken along the lines 4—4 of FIG. 2 it will be noted that particular adjustment and position of third element 16 for providing clamping of wire bundles through pressure application and sandwiching of member 14 within raceway clamp assembly 10 is provided through interlocking of particular ones of teeth 25 of the outer serrated surface of side member 23 with complementary serration 29 on the inner facing surface portion of aperture 51 in third member 16. It should be noted in FIG. 4 that finger tab 46 protruding from the side edge of third member 16 when deformed upwardly by thumb or forefinger of an operator in the direction of arrow 47 results in release of complementary serration 27 from one of teeth 25 thereby permitting adjustment of third member 16 along the length of arm 23. From the side sectional view of FIG. 1 and the perspective view of FIG. 2 it can also be noted that holes 42, 51, and 52 are similarly equipped with finger tab holding and release means as hereinbefore described in connection with hole 44 shown in detail in FIG. 4.

Figure 3:
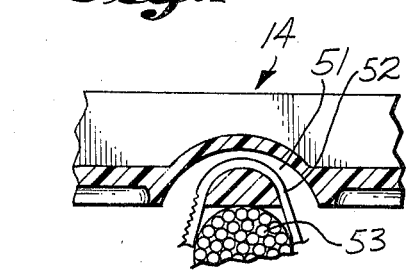
FIG. 3 is a section taken along the lines 3—3 of FIG. 2 showing strap support of a wire bundle.

FIG. 3 which is a section taken along the lines 3—3 of FIG. 2 is believed helpful in understanding the tunnel area 51 through which a self-locking tie down strap 52 is utilized to cinch up and tie down a wire bundle 53. Tunnel area 51 is seen to provide a slot in second member for passage of tie down strap 52 with similar tunnel area slots being provided for adjustable straps throughout raceway clamp assembly 10 as seen in FIGS. 1 and 2.

Figure 5:
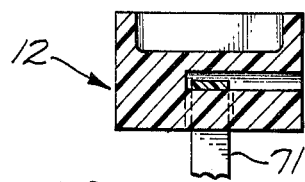
FIG. 5 is a sectional view taken along the lines 5—5 of FIG. 2 showing a side view of an individual mounting strap in the U-shaped base supporting element for securing a wire bundle assembly; and, FIG. 6 is a sectional view taken along the lines 6—6 of FIG. 2 showing a bottom view of the intermediate wire bundle supporting element.
Figure 6:
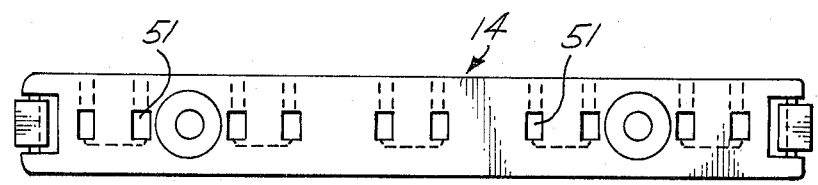

FIG. 5 is a sectional view taken along the lines 5—5 of FIG. 2 showing a tunnel area and specifically the location of adjustable strap 71 of FIG. 2 within the slot formed in a tunnel area.

It can now be appreciated that the first member comprising a U-shaped base member 12 of raceway clamp assembly 10 is mounted in the ceiling or support structure of the aircraft 11, thus permitting easy installation and removal of wire bundles previously mounted to second member 14 in a wire shop. Such simplified installation of wire bundles so prepared in the wire shop by snap fit installation removes difficulties and time consumed in direct installation of wire bundles within the airplane structure itself at the time of installation of the wire bracket. Subsequent to adjustment of wire bundle assembly carried by second member 14 within U-shaped base member 12, third element 16 is installed on side arms 23 and 24 via openings 51 and 52. Third member 16 includes a cross member portion 116 supporting cushion 118 which is utilized to support and apply pressure to the plurality of wire bundle assemblies supported by second member 14 thereby completing the sandwich assembly within U-shaped base member 12 of the present raceway clamp assembly. The present snap-on concept provided by the locking feature hereinbefore described in connection with the description of FIG. 4 permits adjustment and assembly of the present raceway clamp assembly 10 on site in the aircraft subsequent to preparation of wire bundles to the second member thereby reducing installation time and providing an integral and structurally sound wire bundle support structure wherein separation between individual wire bundles in an array within the raceway clamp assembly is retained.

I claim:

1. A raceway clamp assembly comprising:
a three-part clamp for retaining an array of wire bundles a predetermined distance spaced individually one from another, said three-part clamp including a U-shaped base member having serrated side arms for retaining in snap fit relationship an intermediate wire bundle supporting element, and a cushioned third element in pressure fit relationship with said intermediate wire bundle supporting element within said raceway clamp assembly;
said third element having an aperture, said aperture having an inner facing surface portion with complementary serration for interlocking with said serrated side arms;
said U-shaped base member having a bottom portion, and said bottom portion including a plurality of mounting holes for securing said raceway clamp assembly to aircraft structure;
said serrated side arms being resiliently movable toward and away from each other, said serrated side arms being substantially parallel, and said serrated side arms having exterior surface serrations facing downward toward said bottom portion;
said intermediate wire bundle supporting element having an aperture, said aperture having an inner facing surface portion with complementary serration for interlocking with said serrated side arms; and
each of said apertures of said third element and said intermediate wire bundle supporting element having associated respectively therewith a finger tab for releasing respectively said third element and said intermediate wire bundle supporting element, thereby permitting adjustment respectively of said third element and said intermediate wire bundle supporting element along the length of said serrated side arms.

* * * * *